R. A. BOSWELL.
AMPLIFYING TUBE.
APPLICATION FILED SEPT. 26, 1910.
997,265.
Patented July 11, 1911.
2 SHEETS—SHEET 1.
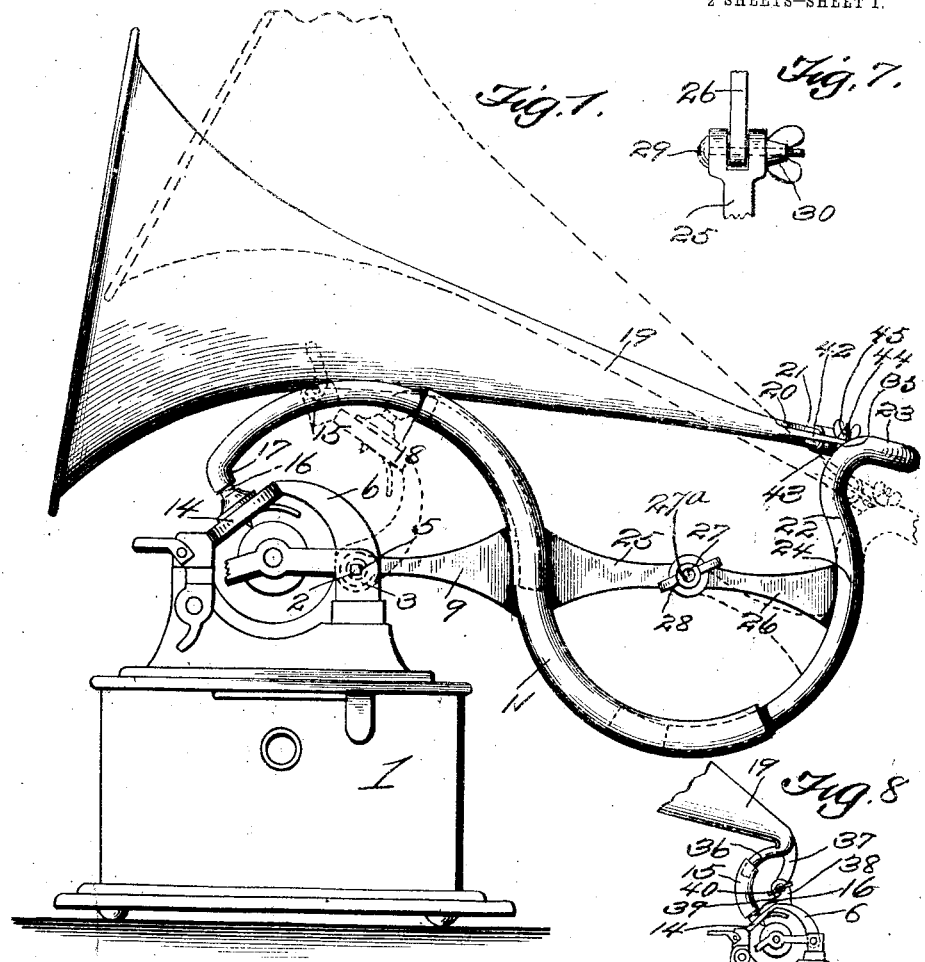
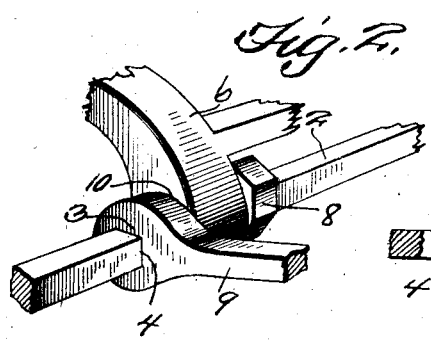
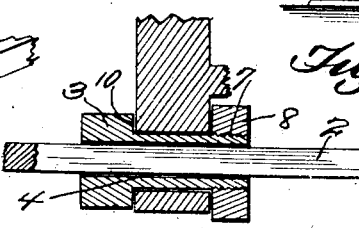
Witnesses
Inventor
Rob. A. Boswell
Attorneys

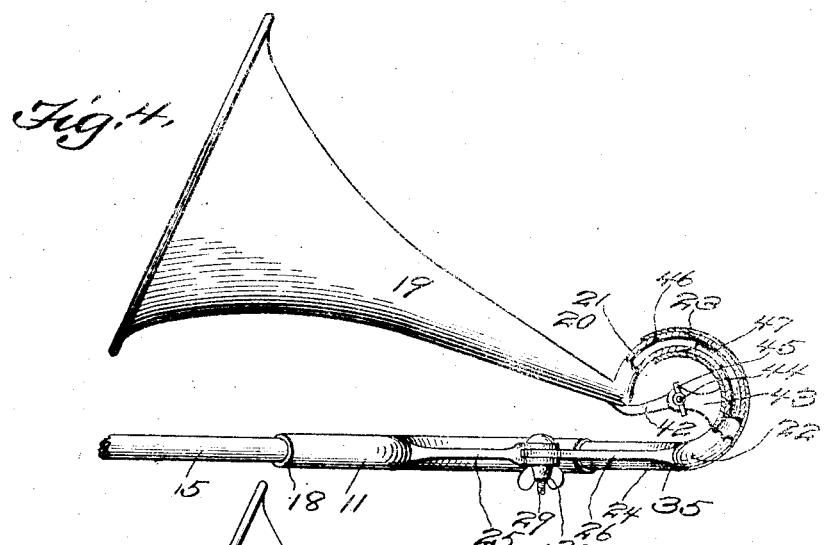
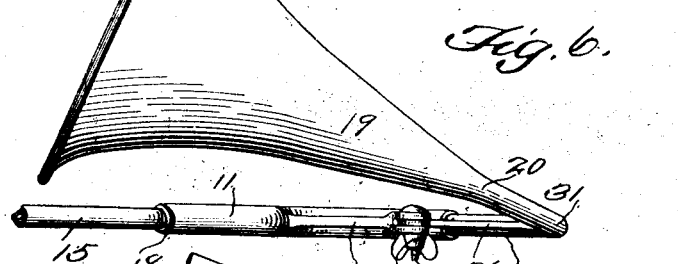
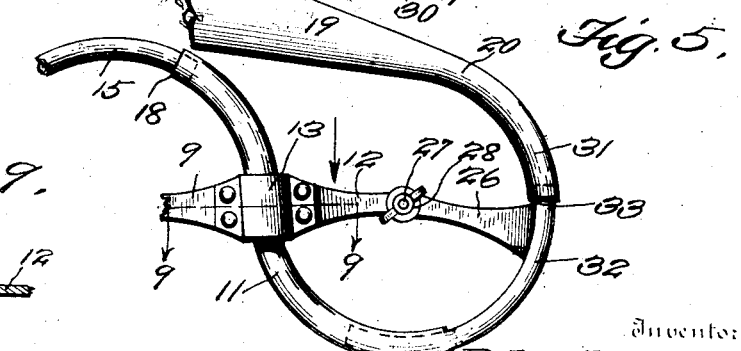

UNITED STATES PATENT OFFICE.

ROBERT A. BOSWELL, OF WASHINGTON, DISTRICT OF COLUMBIA.

AMPLIFYING-TUBE.

997,265.

Specification of Letters Patent.  Patented July 11, 1911.

Application filed September 26, 1910. Serial No. 583,704.

*To all whom it may concern:*

Be it known that ROBERT A. BOSWELL, a citizen of the United States of America, residing at Washington city, District of Columbia, has invented a new and useful Amplifying-Tube, of which the following is a specification.

This invention is classified in the art of acoustics, and it essentially pertains to a new and useful amplifying tube or horn, adapted for use upon a talking machine of a type which is generally known as the cylinder machine.

In machines of the cylinder type, prior to this invention, the bell portion of the majority of the amplifying tubes is pivotally supported, while the smaller portion of the tube has a pivotal or swiveled connection with the reproducer in such wise as to allow the amplifying tube or horn to oscillate, as the reproducer is fed along the record. This structure of machine, it has been held, in some respects, is un-symmetrical, awkward and clumsy, and, the basic purpose of this invention is to eliminate these objectionable features, and furthermore, to improve the structural details of the amplifier. By improving such structural details, the sound, to some extent, is increased, because of the lengthy travel (which has been increased beyond that heretofore utilized) of the volume of sound through the amplifier (the greater portion of which is restricted to a very small diameter in cross section). The volume of sound, when passing through this restricted portion of the amplifier, is held constricted until it reaches a point, where the amplifier begins to enlarge into the bell portion thereof. In eliminating the objectionable features, an amplifier or tube is produced, which travels laterally of the record, and, as one body with the reproducer and its arm; the amplifier being so shaped, mounted, and supported as to allow the reproducer to be raised, and, in so doing, the tone-arm is moved telescopically and longitudinally with regard to the remainder of the amplifier. This amplifier comprises an intermediate supported portion, known as the compound curved tubular member, and two free end portions, correspondingly curved, telescopically and longitudinally movable in regard thereto, one being classed as the bell member, while the other is the tone arm. The bell member, however, cannot only move telescopically, with relation to the compound curved member, but may be oscillated laterally, because it is provided with a contracted curved portion, which is telescopically movable with regard to a tubular member correspondingly curved. This tubular member, in other words, is an additional compound curved member, which is telescopically movable with regard to the first-named compound curved tubular member. In Figure 6, however, the bell member is allowed to oscillate laterally, because it consists of two parts, the bell member and the extension thereof, joined together by one, two or three threads; the extension being telescopically movable relatively to the compound curved tubular member, for instance, the first-mentioned compound curved member. This same structure is shown also in Figure 5 in side elevation. The invention not only embraces the above features, but embodies means, whereby as the bell member is raised and lowered, the extension thereof moves exactly concentric in conjunction with the compound curved member, and may be held in any desired position. When the reproducer is lifted to the fullest extent above the record, it may be readily supported, as shown in dotted lines.

The drawing only discloses one form of the invention, but in practical fields this form may necessitate changes and alterations, to which the applicant is entitled, provided such changes and alterations are comprehended by the appended claims.

Referring to the drawings,

Figure 1 is a side elevation of a talking machine, generally known as the cylinder machine, provided with what is known in the art as the compound curved tubular member, for the support of the free moving parts of the amplifier.

Figure 2 is a detail perspective view of the connection between the reproducer arm, the guide rod therefor, the sleeve upon the guide rod, and the connection between the sleeve and the compound curved tubular member.

Figure 3 is a detail sectional view longitudinally through the structure shown in Figure 2.

Figure 4 is a top plan view of the amplifier, showing the first-named compound curved tubular member, the tone arm, the bell member having a curved portion at its contracted end, and the extension or second-named compound curved tubular member, correspondingly curved with regard to the first-named compound curved tubular member and the curved contracted end of the bell member.

Figure 5 is a side elevation of the first-named compound curved tubular member, a portion of the tone arm, a portion of the bell member and its extension, showing the threaded connection between the extension and the bell member, and clearly disclosing the fact that these parts are telescopically movable with regard to one another, and further showing the means whereby the extension and the bell member may move exactly concentric with regard to the compound curved member.

Figure 6 is a top plan view of the structure shown in Figure 5.

Figure 7 is a detail elevation of the joint or connection between the extension or the second-named compound curved tubular member and the first-named compound curved tubular member.

Figure 8 is a side elevation of the same form of machine as shown in Figure 1, only illustrating the fact that the bell member has a curved contracted end portion and fulcrumed upon the reproducer arm, and showing that the curved contracted portion is telescopically movable with regard to the tone arm.

Figure 9 is a sectional view on line 9—9 of Figure 5.

As to the drawings, 1 denotes the casing of the talking machine, containing the usual mechanism, (not shown), for rotating the record and the mandrel; the structure of the mandrel forms no part of the present invention.

In mounting an amplifier upon this style of machine, the same necessarily has to be moved laterally, and as one body, with the reproducer and its arm. This lateral movement is accomplished by disposing of the usual form of guide rod (which is usually cylindrical) and in its place the rod 2 is arranged. This rod 2 is rectangular in cross section, and receives the sleeve 3. This sleeve 3 is slidable laterally upon the rod 2, for the reason that it is provided with a rectangular bore 4. The ends of the rod 2 may be supported in bearings of the frame of the machine in any conventional manner, as shown at 5. It is to be understood that in practice the ends of this rod must be so mounted as to allow the same to be removed, for instance, the ends of this rod may only have sufficient frictional bearings in the frame of the machine, of such a character as to allow the same to be readily moved by forcing a sliding action thereto. The outside circumference of the sleeve 3 is cylindrical in order to provide a pivotal bearing for the reproducer arm 6, and is provided at one end with threads 7, to receive the threaded nut 8, which prevents displacement, laterally, of the reproducer arm. It will be readily understood that the reproducer arm may be easily raised and lowered upon the sleeve. At one end of the sleeve, an arm 9 rearwardly projects, and where this arm forms a part of the sleeve, a shoulder 10 is provided, against which the reproducer arm 6 abuts. Between this shoulder and the nut, the reproducer arm 6 is positioned. The rearwardly projecting arm 9 extends rearwardly sufficient to allow the reproducer arm to swing or oscillate upon an arc of a circle, using the rod 2 as a center. The rearwardly extending arm 9 connects with the compound curved tubular member 11. This connection between the arm 9 and the member 11 may be integral, as shown in Figure 1, or detachable, as shown in Figure 5. If made detachable, the arm 9 and the arm 12 are made in one piece, and where they project from the compound curved tubular member, they are recessed to receive the said member 11, and are clamped to the member 11 by the plate 13.

The reproducer arm 6 carries the usual form of reproducer 14, to which is connected the tone arm 15, by means of the threaded connection 16. This tone arm 15 is correspondingly curved with regard to the compound curved tubular member 11, in order that when the reproducer and its arm 6 is lifted or raised from the record, the tone arm will telescopically move relatively to the curved member 11. When the reproducer and its arm is raised or lifted, the same is supported in such position by the slight curve 17 of the tone arm coming in contact with the upper forward end 18 of the member 11, as shown in dotted lines in Figure 1. 19 represents the bell member of the amplifier having a contracted end portion 20, which terminates into a curved portion or neck 21. 22 denotes an additional compound curved tubular member, the portion 23 of which is correspondingly curved with relation to the curved portion or neck 21, and is designed to telescopically receive said portion or neck 21, while the portion 24 of the additional compound curved tubular member is curved correspondingly with regard to the first-named compound curved tubular member and is received thereby. The compound curved tubular member 11 in Figure 1 is formed with an arm 25 (which is similar to the arm 12 in Figure 5), it being possible to mount the arm 25 in the same manner as the arms 9 and 12 are mounted on the said member 11. This arm 25 extends to a point, marked 27ª on which the arc of a portion of the member 11, and the portion 24 of the member 22 are curved. The extremities of the arms 25 and 12 are bifurcated, as shown clearly in Figures 4, 6 and 7, in order to receive the extremity of the arm 26, or it may be plain, as shown in Figures 1 and 5, and the extremities of the arms 25 and 12 and the arm 26 clamped together by means of a bolt and winged nut 27 and 28. When the arms 25 and 12 having the bifurcated portion receive the extremity of the arm 26, they are clamped in position by the aid of the bolt 29 and the winged nut 30, as shown clearly in Figures 4, 6 and 7, thereby holding the bell member, and the additional compound curved tubular member in various positions. By the production of these coöperating arms 25 or 12 and the arm 26, the bell member and the extension thereof or the additional compound curved member 22 may be moved or oscillated exactly concentric with regard to their centers. The arm 26 may be detachably connected with the portion 24, in the same manner as the arms 9 and 12 are connected in Figure 5.

Attention is directed to the structure shown in Figure 5, in which the bell member 19 has its contracted portion 20 terminating in a downwardly curved portion or neck 31. This downwardly curved portion 31 has threaded connections with the extension 32 of the bell member, as at 33, whereby the bell member may be allowed to oscillate laterally of the machine. This extension 32 is curved correspondingly with regard to the member 11 and is telescopically received thereby, so that the bell member may be raised or lowered. When the bell member 19 is raised or lowered, the same may be held in various positions by tightening up the winged nut 30, or the winged nut 28 in Figure 5. It will be evident, upon referring to Figure 5, that the arm 26 may be connected to the extension at any suitable location, in practice, in order that the throw of the bell member may be increased or decreased.

It will be observed that when it is desired to adjust the bell member 19 in Figure 1, the curved neck 21 coöperates with the portion 23 of the additional compound curved member 22. It will be evident that this portion 23 in practice may be changed somewhat in shape to vary the lateral oscillation of the bell member. The bell member is limited in its oscillation by the contracted portion 20 coming in contact with the extremity of the curved portion 23, when moving in one direction, and when in the other direction, the contracted portion 20 contacts at the point 35, where the portion 23 merges into the portion 24 of the additional compound curved tubular member. Arms similar to the arms 25 and 26 may be provided to coöperate with the contracted portion 20 of the bell member and the curved portion 23, in order to cause the bell member to oscillate exactly concentric with the center of the neck 21 and the portion 23.

It is further evident that the forward weight of the bell member is directly above the body of the machine and its casing, which equally balances with the rearwardly extending portions of the amplifier or the telescopically connected sections. In this manner, the equilibrium of the machine is readily maintained.

In Figure 8 the tone arm 15 is connected to the reproducer 14 in the same manner as shown in Figure 1, for instance by a threaded connection, and designated by the same character 16. The bell member 19 terminates into a curved portion or neck 36, which is correspondingly curved with regard to the tone arm 15, and is received thereby. The bell member is provided with an arm 37, which may be integral or detachably connected therewith. The reproducer arm 6 in Figure 8 is formed with an arm 38. This arm 38 is provided with the bifurcated end similar to the arms 25 and 12, as shown clearly in Figure 7, and in the bifurcated portion of this arm 38 the extremity of the arm 37 is disposed. The bifurcated end of the arm 38 and the extremity of the arm 37 have a bolt 39 penetrating them, and to the threaded end of the bolt, the winged nut 40 is applied. The bolt 39 is similar to the bolt 29 in Figure 7. As the bell member 19 is raised or lowered, the curved portion or neck 36 moves telescopically with regard to the tone arm 15, and exactly concentric therewith, because of the connections between the arms 37 and 38. It may be clearly noted how the various structures in the drawings are operated. It will be further observed that this form of amplifier embodies various novel features, which have heretofore not been conceived, and in so constructing an amplifier of this design, for application upon a machine of this type, the same moves laterally with regard to the machine and the record. It is understood that no matter where the amplifier is positioned as it is moving laterally of the record, the bell member may be oscillated laterally.

The curved portion or neck 21 and the curved portion 23 are provided with pivoted coöperating arms 42 and 43 similar to the arms 25 and 26. These arms are connected by a bolt and a winged nut 44 and 45.

In order to assemble the portions 21 and 23, the portion 21 is made in two parts 46 and 47, the part 47 being first inserted in the portion 23, after which the part 46 is telescopically connected to it by a beveled joint, and then securely soldered or otherwise fastened or made permanent. This is only one method of assembling the portions 21 and 23, it being evident that other methods may be employed.

The invention having been set forth, what is claimed as new and useful is:—

1. A laterally movable amplifying horn; comprising a compound curved tubular member; and telescopically movable free portions correspondingly curved and supported from either end of the member.

2. A laterally movable amplifier; comprising a compound curved tubular member; telescopically movable free portions correspondingly curved and supported from either end of the member; and means permitting one of the free portions to move concentrically with regard to the member.

3. A laterally movable amplifying horn; comprising a compound curved tubular member; telescopically movable free portions correspondingly curved and supported from either end of the member; and means permitting the adjustment and support of either of the free portions in various positions.

4. A laterally movable amplifier; comprising a compound curved tubular member; telescopically movable free portions correspondingly curved and supported from either end of the member; means permitting one of the free portions to move concentrically with regard to the member; the means including means for allowing the adjustment and support of one of the free portions in various positions.

5. In an amplifier; a compound curved tubular member; and a free end portion having telescopically movable connecting means with the member, whereby the free end portion may have universal movements.

6. In an amplifier; a compound curved tubular member; and a free end portion having telescopic connecting means with the member, whereby the free end portion may have universal movements; and means permitting the free end portion to move concentrically with regard to the member.

7. In an amplifier; a compound curved tubular member; a free end portion having telescopically movable connections with the member, whereby the free portion may oscillate laterally and vertically; means permitting the free end portion to move concentrically with regard to the member; the means including means for holding the free end portion in adjusted positions when moved.

8. In an amplifier; a compound curved tubular member; an additional compound curved tubular member telescopically united with the first tubular member; a free end portion having an extension correspondingly curved with regard to the additional compound curved member and telescopically connected to it; said additional compound curved member constituting a medium to permit the free end portion to oscillate laterally and vertically.

9. In an amplifier; a compound curved tubular member; an additional compound curved tubular member telescopically united with the first tubular member; a free end portion having an extension correspondingly curved with regard to the additional compound curved member and telescopically connected to it; said additional compound curved member constituting a medium to permit the free end portion to oscillate laterally and vertically; and means permitting the free end portion and the additional compound curved member to move concentrically with regard to one another.

10. In an amplifier; a compound curved tubular member; an additional compound curved tubular member telescopically united to the first tubular member; a free end portion having an extension correspondingly curved with regard to the additional compound curved member and telescopically united to it; the additional compound curved member constituting a medium to permit the free end portion to oscillate universally; means permitting the free end portion, when oscillated in one direction, to move concentrically with regard to one member and, when oscillated in the other direction, to move concentrically with regard to the other member; the means including means to hold either the additional compound curved member or the free portion in adjusted positions.

11. In an amplifier; a compound curved tubular member; a free portion having connections with the member; the connections embodying correspondingly curved telescopically movable united parts to permit the free portion to move universally through the medium of the parts; the connections including means whereby the free portion may move concentrically with regard to the member.

12. In an amplifier; a compound curved tubular member; a free portion having connections with the member; the connections embodying correspondingly curved telescopically movable united parts to permit the free portion to move universally through the medium of the parts; the connections including means whereby the free portion may move concentrically with regard to the member; the means for permitting the free portion to move concentrically embodying means to hold the free portion in various adjusted positions.

13. In an amplifier; a compound curved tubular member; an additional compound curved tubular member telescopically united with the first tubular member; a free end portion having an extension correspondingly curved in regard to the additional compound curved member and telescopically united to it; the additional compound curved member constituting a medium to permit the free end portion to oscillate universally; means permitting the free end portion and the additional compound curved member to move concentrically with regard to one another; and means permitting the additional compound curved member to move concentrically with regard to the first compound curved member.

14. A laterally movable amplifying horn comprising a compound curved tubular member; movable free portions, correspondingly curved and telescopically connected to the member to have longitudinal telescopical movements therewith, one of the free portions embodying such connections with the member as to permit the same to oscillate universally; means permitting one of the free portions to move concentrically with regard to the member, and including means to hold one of the free portions in its adjusted positions.

In witness whereof, the applicant's signature, is hereunto affixed in the presence of two witnesses.

ROBERT A. BOSWELL.

Witnesses:
 HERBERT D. LAWSON,
 WILLIAM CRICHTON CLARKE.